Dec. 29, 1959    W. FEW    2,918,932
FLOAT LINKAGE FOR AIR CHARGER
Filed May 1, 1957
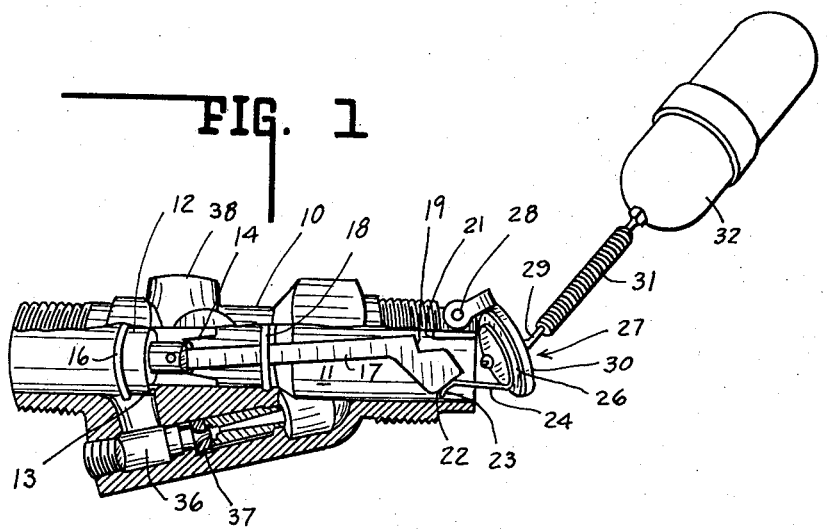
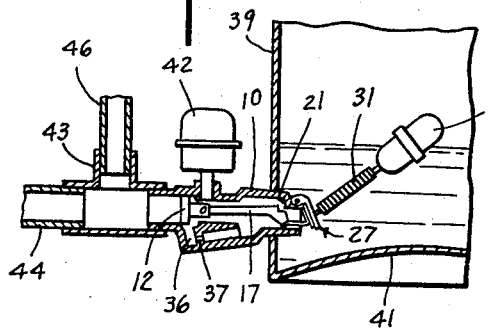
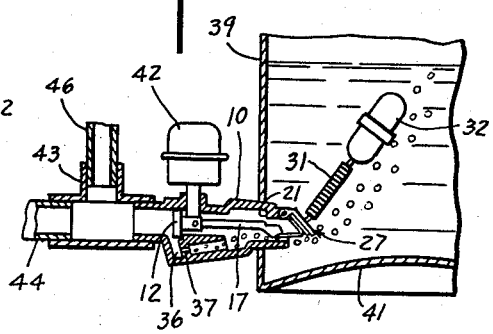
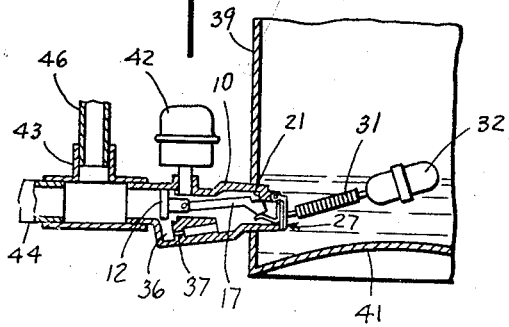
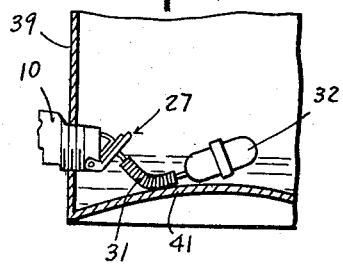
INVENTOR.
WILLIAM FEW.
BY
Maurice A. Weikart
ATTORNEY.

United States Patent Office 2,918,932
Patented Dec. 29, 1959

2,918,932

FLOAT LINKAGE FOR AIR CHARGER

William Few, Goshen, Ind., assignor to Penn Controls, Inc., Goshen, Ind., a corporation of Indiana Application May 1, 1957, Serial No. 656,376

1 Claim. (Cl. 137—211)

The present invention relates generally to air charger assemblies for pressurized tanks and is particularly concerned with providing an improved means for connecting the air charger float to the components actuated thereby.

In domestic water systems, when water is pumped into an empty tank, the air which is in the tank at atmospheric pressure becomes compressed until the pump control cut-out setting is reached thereby causing the pump to stop. If this cut-out setting is assumed to be, for example, 40 pounds per square inch gage pressure, then the water in the tank will have risen to approximately 73% of the tank height when the pump is stopped. If the pump control cut-in setting is assumed to be 20 pounds per square inch gage pressure, then a tank withdrawal sufficient to lower the liquid level in the tank to approximately 58% of the tank height will be required to restart the pump.

Since the amount of water withdrawal that can be made between the cut-in and cut-out settings of the pump control is a direct function of the volume of air trapped in the tank above the liquid level, it is customary to provide the tank with an air volume control which provides for charging air into the tank in addition to that normally trapped therein and thus establishes a tank water level lower than 58% of the tank height at the assumed pressure switch cut-in point of 20 pounds per square inch.

One example of such an air charger control is that disclosed in Nash Patent 2,756,762. Since air charging apparatus of the Nash type must be located below the liquid level in the tank to prevent loss of the tank air charge, it is desirable to install the air charger as close to the bottom wall of the tank as possible thereby providing for a relatively large volume of air to be compressed above the liquid level in the tank. On an application to an existing tank, air charger controls of the Nash type provide greater "draw" capacity with less frequent pump operation. Applied to a tank designed to accommodate such an air charger control, equivalent draw capacity can be provided with a tank of greatly reduced volume as compared with non-charged systems.

Because, as previously pointed out, it is desirable to trap a relatively large volume of air above the liquid level for a given size tank, the air charger assembly should be mounted on the tank as close to the bottom wall as possible. Pressure tanks of the type under consideration conventionally have a crowned bottom wall, that is, the lower end of the upright tank is formed so as to be exteriorly concave in configuration. Since the float component of the air charger assembly must maintain a minimum liquid level above the installed position of the air charger, the float must be connected to the air charger by means of a link, or arm, which offsets the float vertically above the installed air charger. A float arm, or link, giving the required offset makes it necessary to mount the air charger sufficiently high on the tank to permit the float to clear the crowned bottom wall of the tank as the air charger assembly is threaded into an appropriate opening in the tank sidewall.

An object of the present invention is to provide an assembly of the type referred to above in which a flexible connection exists between the float and the lift arm which permits installation of the assembly at a lower, and therefore more advantageous, position with relation to the crowned bottom wall of a water tank.

A further object of the present invention is to provide an assembly which is rugged and relatively unsusceptible to damage in shipping and handling prior to installation within a tank.

These and other objects will become apparent as the description proceeds with reference to the accompanying drawings in which:

Figure 1 represents a cut-away side view of an air charger assembly incorporating the present invention.

Figure 2 is a schematic illustration of the apparatus of Figure 1 installed in a pressurized tank.

Figure 3 is a view similar to Figure 2 but showing the parts in differing relative position.

Figure 4 is a view similar to Figure 1 showing the parts in the positions assumed at a further point in the operational sequence.

Figure 5 is a view similar to Figure 2 but illustrating the air charger assembly in inverted position, a position intermittently assumed as the assembly is threaded into the tank.

Referring initially to Figure 1 the air charger assembly is seen to comprise an elongated housing 10 threaded at each end and having a central liquid passage 11 therethrough. Flow of liquid through the passage 11 is controlled by a poppet-type valve 12 adapted to co-operate with a valve seat 13. The main valve member 12 is formed with extending flanges 14 which guide the valve member 12 for reciprocation within the passage 11. A snap-ring 16, received in the housing 10, serves to establish the limit of lateral motion of valve member 12 away from seat 13. Pivotally connected to the valve member 12 is a valve arm 17 which extends through the passage 11 to a point adjacent the end thereof. The arm 17 extends between two positioning posts 18 (only one of which is shown in Figure 1) provided by a snap-ring appropriately placed within the housing 10. The free end of the arm 17 carries a notch 19 adapted to co-operate with an abutment 21 carried by the upper, inner face of the housing 10. The lower portion of the free end of arm 17 is formed so as to provide an inclined camming surface 22 which co-operates with an appropriately inclined camming surface formed on the head 23 of a lift arm 24. Lift arm 24 forms a part of a safety valve sub-assembly 27 which includes the lift arm, a disk of suitable valve-face material 26 and backing member 30.

Ears are formed adjacent the top of the member 30 which co-operate with a pivot pin 28 rigidly carried by an appropriate boss in the housing 10. Extending from the outer face of the safety valve assembly 27 is a float arm including a rod 29 which is rigidly fastened to a wire helix 31 carrying at its outer end a float 32. The helix 31 is formed so as to be pre-stressed, that is, formed so that in its free position a definite compressive force is exerted between the adjacent coils of the spring. With this arrangement it will be understood that the float is provided with a connecting link or arm which has substantial rigidity but which may be deflected from its normal position if sufficient lateral force is directed against it, and which will return to its normal position when the lateral force is removed.

The body 10 also accommodates a passage 36 which bypasses the valve 12 and its seat 13 and carries therein a venturi fitting 37 which has an appropriate opening to atmosphere (not shown) at its throat thus serving to entrain a relative large quantity of air within the liquid passing through the passage 36. It will be understood that passage 36, because of the venturi fitting 37, offers relatively high resistance to the flow of liquid therethrough, and that, therefore, substantially no liquid and consequently no entrained air, will flow through the passage 36 when the valve member 12 is opened, that is, spaced from its seat 13. A threaded opening through the housing 10, communicating with the passage 11, is provided at 38 to accommodate a conventional pump control or pressure switch.

Referring now to Figures 2 through 4, the operation of the air charger assembly will be described. As may be seen in Figure 2, the air charger body 10 is threaded into an appropriate opening in a side wall 39 of a pressure tank, having a conventional crowned base or bottom wall 41, at a point closely adjacent the bottom of the tank. A conventional pressure switch 42 is attached at the opening 38 and the other end of the housing 10 has threaded engagement with one end of a T fitting 43, the opposite end of which communicates with a pipe 44 which receives the discharge from a conventional liquid pump (not shown), controlled by switch 42 and adapted to supply water, or other liquid, under pressure. The upper opening of the fitting 43 is connected to a pipe 46 which provides the service outlet, in a domestic water supply system this service outlet being connected to the various faucets and other water consuming devices.

The general mode of operation of the air charger assembly enclosed by the housing 10 requires the float 32 to determine the position of the lift arm 24 which, in turn, establishes the position of valve arm 17. With the float in a low position the arm 17 will be raised into engagement with the abutment 21 thereby holding valve 12 away from its seat 13 and permitting water to flow directly into the tank. A high position of the float permits arm 17 to fall away from abutment 21, and when the pump is started, the valve 12 will be closed against its seat 13. Under these conditions water will be forced through the venturi 37, entraining air, and then introduced into the tank.

With the water level in the tank at normal position, indicated in Figure 2, subsequent on-cycles of the pump will discharge water directly into the tank. As air is lost from the tank by, for example, entrainment of air in water discharged from the tank during withdrawals, the water level in the tank will rise. The float 32 will thereupon be moved to its position of Figure 3, with the lift arm 24 being thereby positioned so as to permit the arm 17 to drop away from the abutment 21. With closure of the pressure switch 42, starting the next on-cycle of the pump, the valve 12 will be moved against its seat 13 closing the passage 11 and causing water to flow through the venturi 37 adding air to the tank. This air charging operation will continue with each subsequent on-cycle of the pump until sufficient air has been added to the tank to bring the liquid level therein back to its normal position of Figure 2.

In the event of a power failure to the pump or if the volume of a withdrawal exceeds the pump delivery capacity, the water level in the tank will fall below the normal level and the float will, as may be seen in Figure 4, close the safety valve 27 to prevent the liquid from falling to the level of passage 11 and to thereby prevent the loss of the air charge within the tank. Upon subsequent termination of the excessive withdrawal, water will be discharged directly into the tank as pointed out with reference to Figure 2.

It will be particularly noted that the apparatus of the present invention comprising the somewhat flexible connection between the float 32 and valve 27 provided by the prestressed coil spring or helix 31 is particularly suitable for use with air charger assemblies of the type described. Its use permits the opening in the tank receiving the air charger housing 10 to be located closely adjacent the crowned bottom wall 41 of the tank. This is possible because, although the float mounting extends out of the safety valve assembly 27 at an angle to the longitudinal center line of the housing 10, as shown in Figure 5 the air charger housing may yet be rotatably threaded into the tank wall, the flexibility of the helix 31 permitting the float 32 to clear the bottom wall 41 of the tank as the body 10 is rotated into proper threaded engagement with the tank. A further advantage is provided by the flexible connection between the float 32 and the safety valve 27 in that, before assembly of the air charger into a tank, any blows or rough treatment of the complete air charger assembly in packing for shipment, or other handling, will not result in permanent deformation of the link between the float and the safety valve or other jamming of the parts interior to the air charger housing 10.

The foregoing has described a preferred embodiment of the invention, other modifications may occur to those skilled in the art and it is to be understood that the scope of the present invention is to be limited only by the appended claim:

In combination with a pressure tank having a crowned base wall, an air charger of the type in which a housing has its threaded inner end inserted into said pressure tank, a float positioned within said tank, a float arm extending between the float and the inner end of the housing, the float arm having a configuration which offsets the float above the housing when the air charger is in installed position on the pressure tank, said float arm including a wire helix having a rectilinear axis and formed so that a compressive force is exerted between adjacent coils of the helix when unflexed which is sufficient to maintain the helix axis in rectilinear disposition against the buoyant force exerted on the float, flexure of said helix upon engagement of said float with said crowned base wall as said housing is threaded into the pressure tank thereby permitting said air charger housing to be mounted on said tank at a minimum distance from said tank base wall.

References Cited in the file of this patent
UNITED STATES PATENTS

| | | |
|---|---|---|
| 2,208,785 | Armstrong | July 23, 1940 |
| 2,307,248 | Ullman et al. | Jan. 5, 1943 |
| 2,598,195 | Smith | May 27, 1952 |
| 2,630,316 | Foster | Mar. 3, 1953 |
| 2,756,762 | Nash | July 31, 1956 |